(12) United States Patent
Lee et al.

(10) Patent No.: US 6,946,630 B2
(45) Date of Patent: Sep. 20, 2005

(54) COMBINED TOASTER AND MICROWAVE OVEN AND CONTROL METHOD THEREOF

(75) Inventors: Chang Su Lee, Changwon-si (KR); Sung Un Shin, Changwon-si (KR); Young Jin Oh, Changwon-si (KR)

(73) Assignee: LG Electronics, Inc., Seoul (KR)

( * ) Notice: Subject to any disclaimer, the term of this patent is extended or adjusted under 35 U.S.C. 154(b) by 0 days.

(21) Appl. No.: 10/475,000

(22) PCT Filed: Sep. 3, 2003

(86) PCT No.: PCT/KR03/01806

§ 371 (c)(1),
(2), (4) Date: Oct. 17, 2003

(87) PCT Pub. No.: WO03/026928

PCT Pub. Date: Apr. 3, 2003

(65) Prior Publication Data

US 2004/0118835 A1 Jun. 24, 2004

(51) Int. Cl.[7] .................................................. H05B 6/68
(52) U.S. Cl. ........................ 219/680; 219/685; 219/720; 219/506; 99/385; 99/451
(58) Field of Search ................................ 219/685, 680, 219/725, 739, 756, 762, 763, 386, 521, 413, 506, 720; 99/385, 391, 392, 393, 399, 400, 402, 451, DIG. 14

(56) References Cited

U.S. PATENT DOCUMENTS 5,317,134 A * 5/1994 Edamura ..................... 219/720
5,802,957 A * 9/1998 Wanat et al. .................. 99/327
5,967,021 A * 10/1999 Yung ............................ 99/327
6,205,910 B1 * 3/2001 Vaughn ........................ 99/326
2002/0070212 A1 * 6/2002 Choi et al. ................... 219/680

FOREIGN PATENT DOCUMENTS

| EP | 1 213 948 A2 | 6/2002 | |
|---|---|---|---|
| JP | 3271630 | 12/1991 | |
| JP | 4-55622 | * 2/1992 | ................. 219/685 |
| WO | WO 99/53766 | 10/1999 | |

OTHER PUBLICATIONS

International Search Report: Austrian Patent Office: Nov. 25, 2003.

* cited by examiner

Primary Examiner—Philip H. Leung
(74) Attorney, Agent, or Firm—McKenna Long & Aldridge LLP.

(57) ABSTRACT

Disclosed is a combined toaster and microwave oven, including: a plurality of heaters disposed close to both surfaces of a slice of bread so as to apply a heat to the slice of bread inserted into a slot in a toaster; a control panel for selecting a bread kind and a bread baking level which a user desires; a display unit for displaying the bread kind and the bread baking level selected in the control panel; and a controller for controlling to selectively operate the heater according to the bread kind and the bread baking level selected in the control panel.

20 Claims, 13 Drawing Sheets

Browning 3 at Toast mode

Browning 7 at Bagel mode

COMBINED TOASTER AND MICROWAVE OVEN AND CONTROL METHOD THEREOF

This application claims the benefit of International Patent Application No. PCT/KR03/01806, filed on Sep. 3, 2003, which claims benefit of Korean Patent Application Nos. P 2002-0053007, filed Sep. 3, 2002, P 2002-0053008, filed Sep. 3, 2002, P 2002-0053201, filed Sep. 4, 2002, P2002-0054279, filed Sep. 9, 2002, and P 2002-0084516, filed Dec. 26, 2002, which are hereby incorporated by reference for all purposes as if fully set forth herein.

TECHNICAL FIELD

The present invention relates to a microwave oven, and more particularly, to a combined toaster and microwave oven and a control method thereof.

BACKGROUND ART

Generally, a microwave oven is an apparatus for heating a heat object by means of microwave. Describing the construction of the microwave oven, as shown in FIG. 1, a heating chamber 2 supplied with the microwave and housing the heat object therein is provided in a cavity assembly 1, and the heating chamber 2 is constructed to be opened and closed by a door 4.

Additionally, at one side of the heating chamber 4, an electronic chamber 10 for generating the microwave is provided, and the electronic chamber 10 is constructed to be covered with an outer case 6. Inside the electronic chamber 10 are installed a magnetron 12 for oscillating the microwave, a high voltage transformer 14 for applying high voltage to the magnetron 12, and a blower fan (not shown) for cooling the electric components and forming an air-flow passing through an internal section of the heating chamber 2.

Although the above-constructed conventional microwave oven has various functions to cook various foods, until now, there no exists a microwave oven having a function that can toast with ease.

In other words, since the conventional microwave oven not having the heater cannot cook a toast at all, in case users intend to make a toast as a simple food, they has suffered from inconvenience of using a separate toaster even though the microwave oven has many functions. Accordingly, the conventional microwave oven has a drawback in which a toaster purchase cost is not only added but also inconvenience in use is caused.

DISCLOSURE OF THE INVENTION

Accordingly, the present invention is directed to a combined toaster and microwave oven and a control method thereof that substantially obviates one or more problems due to limitations and disadvantages of the related art.

An object of the present invention is to provide a combined toaster and microwave oven and a control method thereof in which a slice of bread can be selectively baked at one surface or both surfaces thereof.

Another object of the present invention is to provide a combined toaster and microwave oven and a control method thereof in which a browning level of bread can be obtained in an identical degree according to a user's intent even in several times of toasting operations.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a combined toaster and microwave oven, including: a plurality of heaters disposed close to both surfaces of a slice of bread so as to apply a heat to the slice of bread inserted into a slot in a toaster; a control panel for selecting a bread kind and a bread baking level which a user desires; a display unit for displaying the bread kind and the bread baking level selected in the control panel; and a controller for controlling a selective operation of the heater according to the bread kind and the bread baking level selected in the control panel.

The control panel includes a bread selection button unit for selecting the bread kind; and a level selection button unit for selecting any one of bread baking levels distinguished into a plurality of stages.

The display unit includes display means for displaying the selected bread kind by a character and a picture; and a plurality of light emitting elements comprised of the same number as that of the number of the bread baking levels so as to display the selected bread baking level.

The controller controls operates a central heater disposed between the slots in case it is intended to bake one surface of the bread, and operates the central heater and side heaters disposed at sides of the slots in case it is intended to bake the both surfaces of the bread.

In another aspect of the present invention, there is provided a control method of a combined toaster and microwave oven, the method including the steps of: selecting a bread kind and a bread baking level by a user; displaying the bread kind and the bread baking level selected by the user; determining whether one surface or both surface of a slice of bread is baked according to the selected bread kind, and setting a bread baking time according to the selected bread baking level; and cooking the slice of bread according to the determined and set items.

Additionally, the control method further includes the step of, before the bread baking level is selected by the user, displaying a digit corresponding to a middle level among a plurality of predetermined bread baking levels.

In yet another aspect of the present invention, there is provided a combined toaster and microwave oven, including: a central heater disposed between slots in a toaster and side heaters disposed on side surfaces of the slots so as to heat a slice of bread; a control panel for selecting a bread kind and a bread baking level which a user desires; a display unit for displaying the bread kind and the bread baking level selected in the control panel; a controller for controlling a selective operation of the heaters according to the bread kind and the bread baking level selected in the control panel; and first and second driving elements for respectively supplying a power supply for the central heater and the side heaters according to control of the controller.

The controller turns-ON the first driving element in case it is intended to bake one surface of the bread, and turns-ON the first and second driving elements in case it is intended to bake the both surfaces of the bread.

The display unit includes: display means for displaying the selected bread kind through a character and a picture, and for displaying the selected bread baking level by a digit;

and a plurality of light emitting elements comprised of the same number as that of the number of the bread baking levels so as to display the selected bread baking level.

The combined toaster and microwave oven further includes: a flatted bread holder disposed on one side surface of the slot; and a curved (surface-curved) bread holder disposed on the other side surface of the slot.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE FOR CARRYING OUT THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
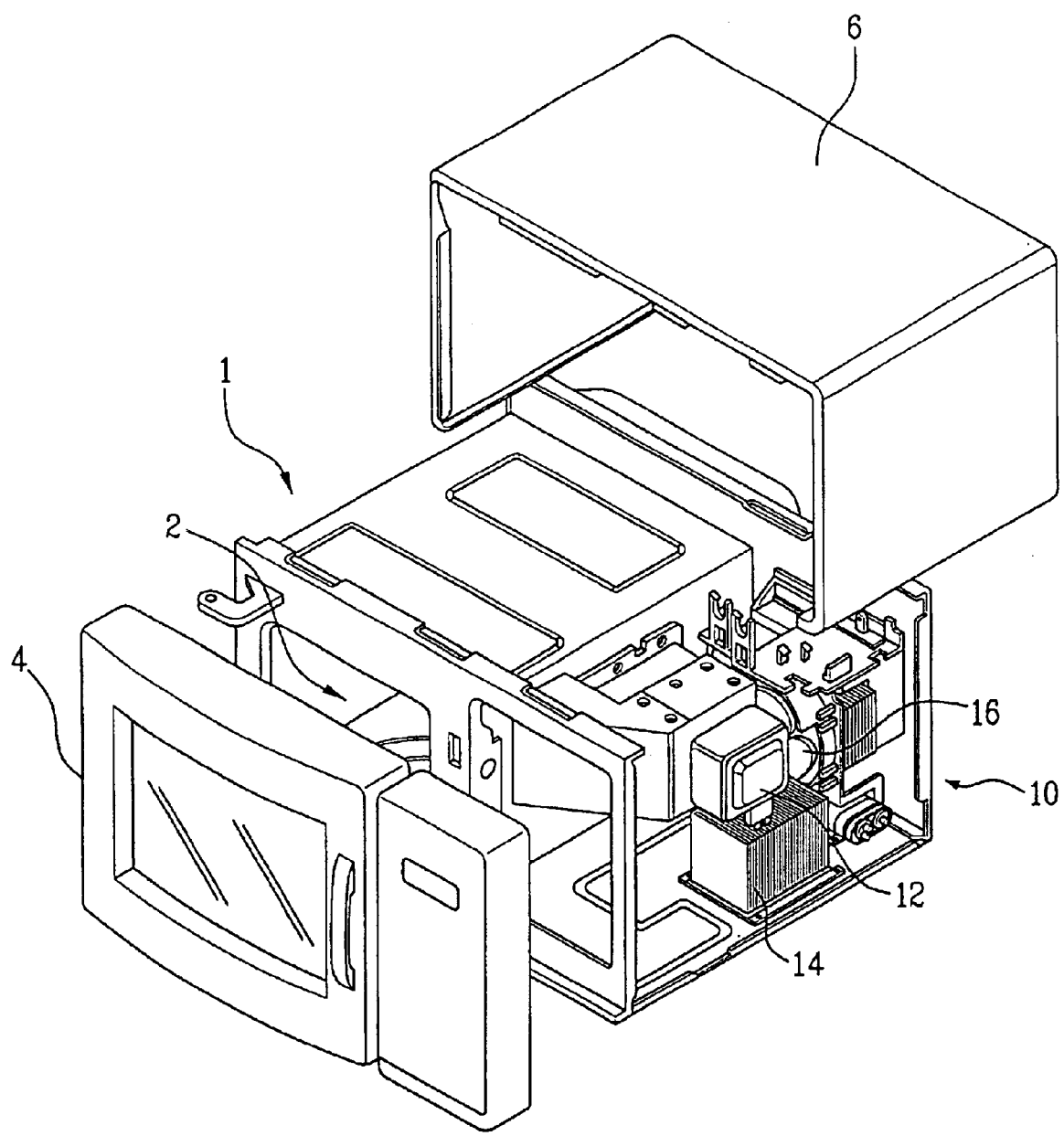
FIG. 1 is a view illustrating a conventional microwave oven.
Figure 2:
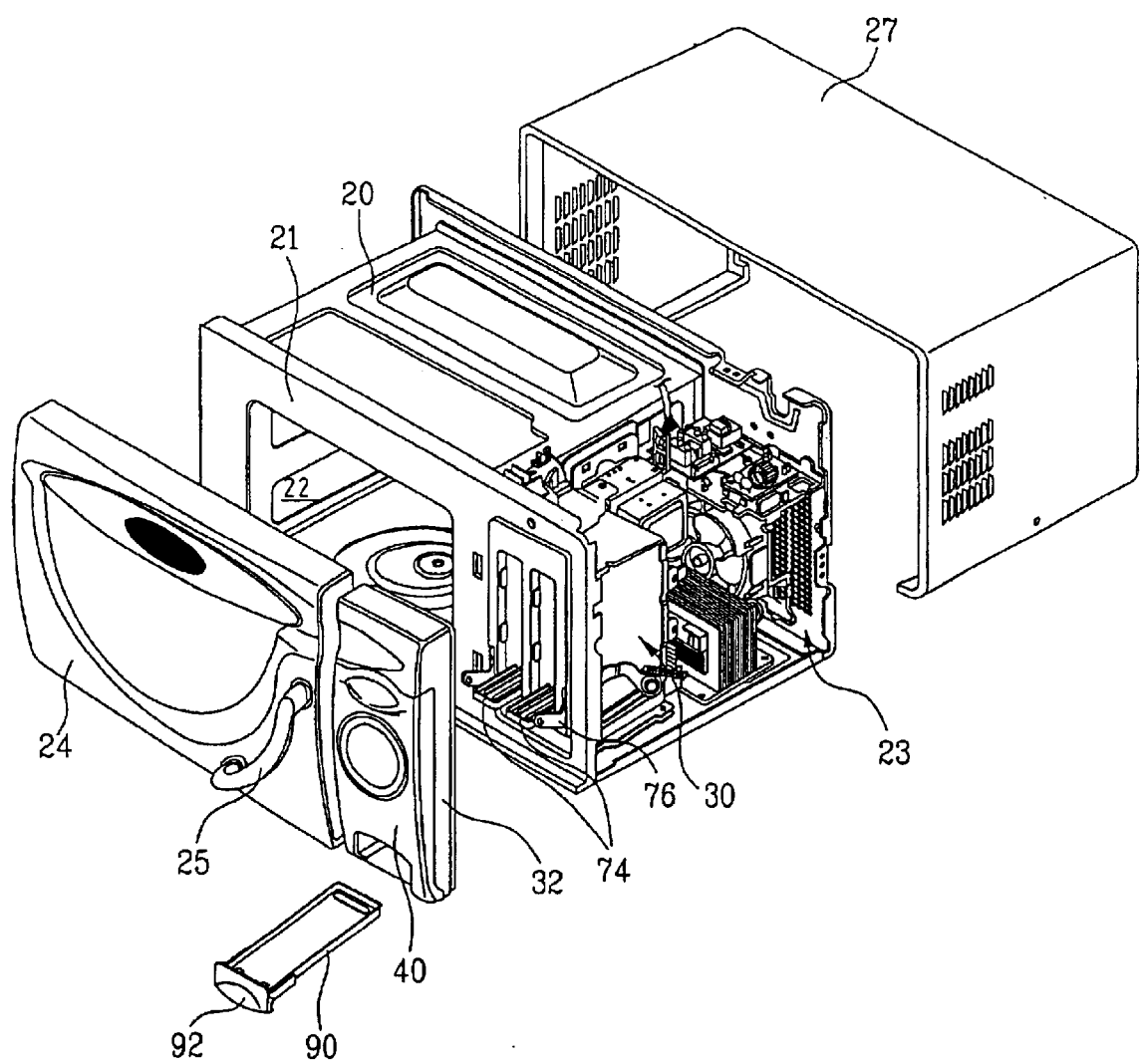
FIG. 2 is a view illustrating a combined toaster and microwave oven according to a preferred embodiment of the present invention.
Figure 3:
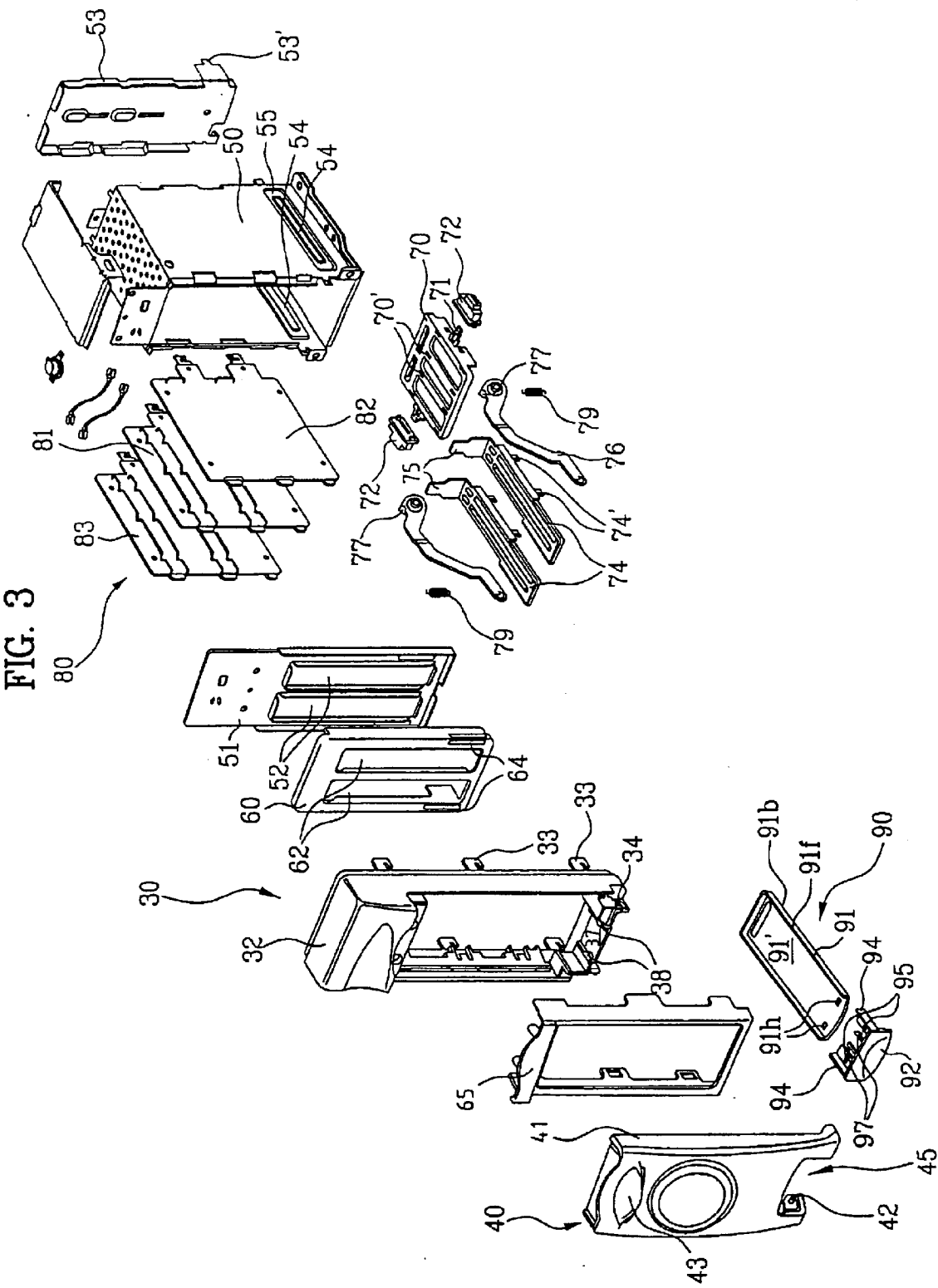
FIG. 3 is a view illustrating a construction of a toaster of FIG. 2.

FIG. 2 is a view illustrating a combined toaster and microwave oven according to a preferred embodiment of the present invention, and FIG. 3 is a view illustrating a detailed construction of a toaster of FIG. 2.

As shown in FIG. 2, a cooking chamber 22 is disposed at one side of the internal section of the cavity assembly 20, and the electronic chamber 23 is disposed at the other side of the internal section of the cavity assembly 20. In an internal section of the cooking chamber 22, a dish is made using mainly the microwave, and in an internal section of the electronic chamber 23 is installed each kind of electronic components for oscillating the microwave. A reference numeral 21 indicates a front plate.

The cooking chamber 22 is opened and closed by means of a cooking chamber door 24. The cooking chamber door 24 performs a closing operation in a type of adhering to the front plate 21 to screen the internal section of the cooking chamber 22 from an external. A reference numeral 25 is indicates a handle for an opening and closing of the cooking chamber door 24. Additionally, an outer case 27 screens the cavity assembly 20 and the electronic chamber 23. The outer case 27 forms an appearance of an upper surface and both side surfaces of the microwave oven in this embodiment.

As shown in FIG. 3, in the electronic chamber 23 is installed a toaster 30 passing through the front plate 21. In front of the toaster 30 is disposed the toaster panel 32. In the toaster panel 32 is installed a toaster door 40. At a rear side of the toaster panel 32 is installed a toaster case 50. The toaster case 50 is combined with the toaster panel 32 through the front plate 21. The toaster case 50 is formed of a metallic material and includes a space for baking a slice of bread in its internal section.

In front of the toaster case 50 is disposed a case front panel 51. The case front panel 51 includes an input port 52 for inputting the bread into and outputting from the toaster case 50.

The toaster front 60 is installed in the case front panel 51 and is formed of the metallic material. The toaster front 60 is, when the toaster door 40 is opened, exposed to the external, and includes a plurality of rectangular input ports 62 arranged in parallel. The input port 62 is communicated with the input port 52 of the case front panel 51.

In the internal section of the toaster case 50 is installed a tray support 70. On the tray support 70 is provided a tray 74 for standing the bread in a longitudinal direction. The number of the tray 74 is the same as that of the input port 62, and the tray 74 is, when the toaster door 40 is opened, protruded toward the external at a predetermined length through the input port 62.

In the internal section of the toaster case 50 are installed heaters 80 for generating a heat for baking the bread. The heaters 80 are respectively installed in corresponding positions of both surfaces of the bread to respectively apply the heat to the both surfaces of the bread. The heater 80 has a hot wire embedded therein to generate the heat, and regularly heats the both surfaces of the bread standing upright on the tray 74. Additionally, through a lower part of the toaster panel 32, in the internal section of the toaster case 50 is installed a bread fragment tray 90 being drawn and inserted in a drawer manner.

In the above-constructed toaster 30, if the toaster door 40 opens, the tray 74 is forwarded to the front through the input port 62. In this state, if the toaster door 40 closes in a state where the bread stands upright on the tray 74, a movement of the tray 74 causes the bread to enter into the toaster case 50.

After that, if a power supply is applied to the heater 80, the bread is baked with the heat being generated. The heater 80, as shown in FIG. 3, is installed such that the both surfaces of the bread can be baked. In other words, since the both surfaces of the bread standing upright on the tray 74 can be baked, the heater 80 is comprised of a left heater 83, a right heater 82 and a central heater 81. The slice of bread is inserted between the left heater 82 and the central heater 81, and another slice of bread is inserted between the right heater 82 and the central heater 81. Such case is the case in which the tray 74 includes two input ports for inputting and outputting the bread. If the input ports are three, the heaters 80 will be all four summing two at a central side and one each by each at a left side and a right side.

Figure 4:
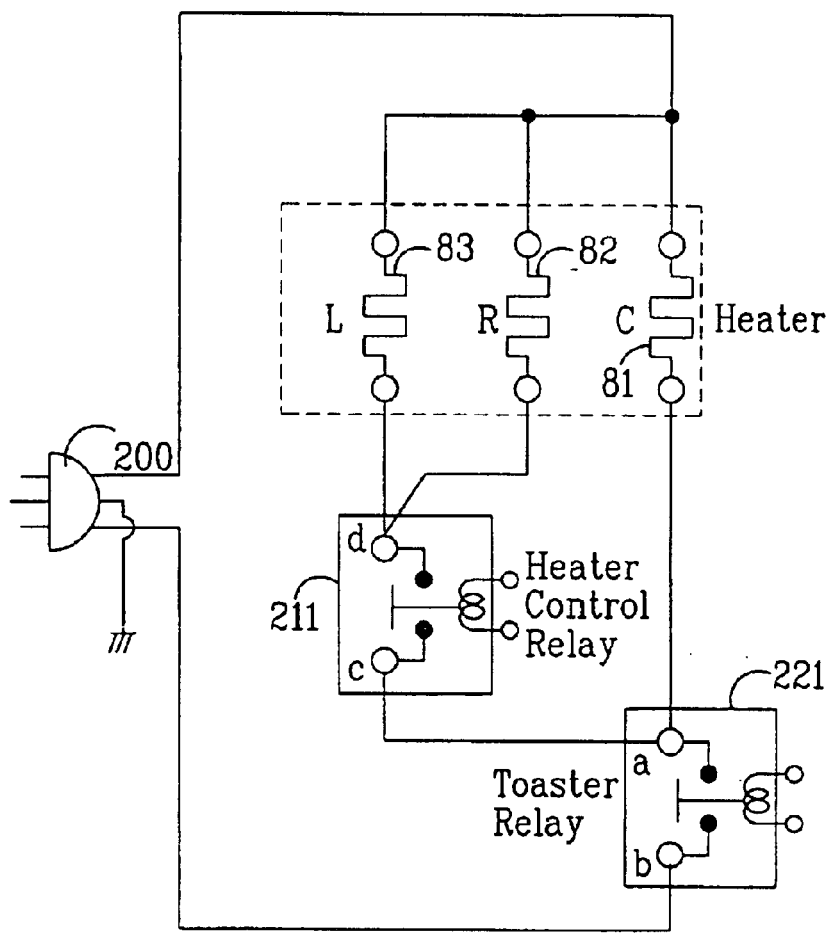
FIG. 4 is a view illustrating a heater control circuit of a toaster of FIG. 2.

FIG. 4 is a view illustrating a heater control circuit of a combined toaster and microwave oven according to a preferred embodiment of the present invention.

As shown in FIG. 4, the three heaters 81, 82 and 83 arranged in parallel are connected to one side of the power supply terminal 200. Additionally, the heater 81 is connected to a terminal (a) of a toaster relay 221, and the two heaters 82 and 83 are connected to a terminal (d) of a heater control relay 211. The other terminal (c) of the heater control relay 221 is connected to the terminal (a) of the toaster relay 221. Additionally, the other terminal (b) of the toaster relay 221 is connected to the power supply terminal 200.

When between the two terminals (c, d) of the heater control relay 211 and between the two terminals (a, b) of the toaster relay 221 are connected by means of a coil, the heater control relay 211 and the toaster relay 221 are operated. In case only the toaster relay 221 operates, only the heater 81 centrally disposed operates. In case the toaster relay 221 and the heater control relay 211 are all operated together, the left heater 83, the right heater 82 and the central heater 81 are all together operated.

Figure 5:
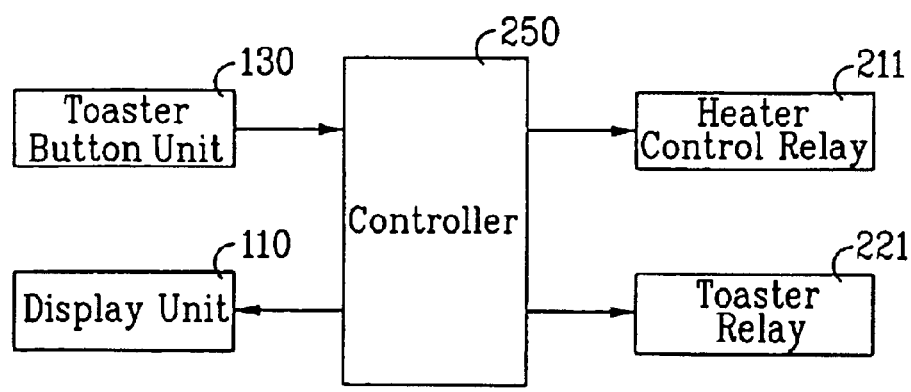
FIG. 5 is a block diagram illustrating constructions necessary for controlling an operation of a heater of FIG. 3.

FIG. 5 is a block diagram illustrating constructions necessary for controlling an operation of a heater of FIG. 3.

As shown in FIG. 5, a controller 250 controls an operation of the heater control relay 211 and the toaster relay 221 which are driving elements of the heaters 81, 82 and 83. Additionally, an operation control of the heater control relay 211 and the toaster relay 221 is based on a user's signal for selecting a bread kind. The signal for selecting the bread kind is Inputted to the controller 250 through a toaster button unit 130, and a cooking state is displayed through the display unit 110.

Hereinafter, in case the bread is baked in the combined toaster and microwave oven according to the present invention, a procedure of controlling an operation of the heater for baking the bread on its both surfaces or one surface will be described.

Figure 6:
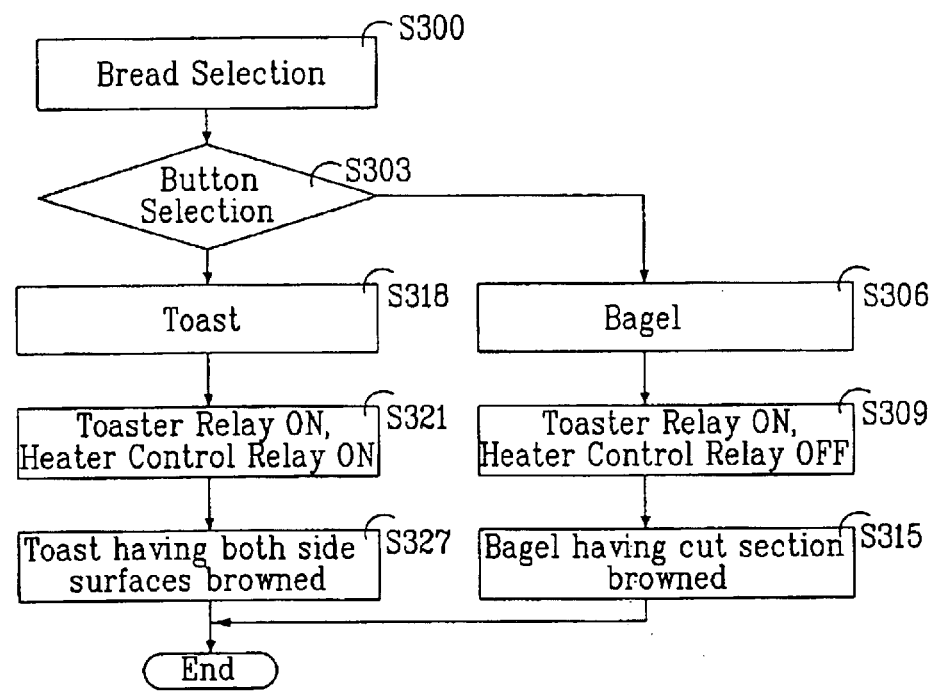
FIG. 6 is a flow chart for describing a control method of a heater in a combined toaster and microwave oven according to a preferred embodiment of the present invention.

FIG. 6 is a flow chart for describing a control method of a heater in the combined toaster and microwave oven according to a preferred embodiment of the present invention.

At first, the inventive combined toaster and microwave oven necessarily includes an operation button for controlling the operation of the heater by the bread kind so that, in case the bread is baked, the bread can be baked on its both surfaces or one surface according to a condition of the bread. The operation button is installed in a toaster button unit 130.

A user selects the bread kind through the operation button installed in the toaster button unit 130. For example, since the bread should be baked on both surfaces for a toast and the bread should be baked on one surface for a bagel, a cooking way is different according to the bread kind. Accordingly, if the bread kind is selected, the controller 250 determines whether the button signal inputted by the user corresponds to an arbitrary bread kind (S303).

If it is determined whether the user selects the bagel having only one surface baked in the step of S303 (S306), the controller 250 turns-ON the toaster relay 221 and controls the heater control relay 211 to be in an OFF state (S309).

Through the toaster relay 221 turned-ON in the step of S309, to the central heater 81 is applied the power supply, but to other two heaters 82 and 83 is not applied the power supply. Accordingly, the bread put between the heaters 81, 82 and 83 has only one surface baked by means of the central heater 81 (S315). Since the left heater 83 and the right heater 82 are not operated, the other surface of the bread is not baked.

If it is determined whether the user selects the toast having the both surfaces baked in the step of S303 (S318), the controller 250 controls all the toaster relay 221 and the heater control relay 211 to be in an ON operation state.

Through the toaster relay 221 ON-operating in the step of S321, to the central heater 81 is applied to the power supply, and at the same time, through the ON-operating heater control relay 211, to other two heaters 82 and 83 are also applied the power supply. Accordingly, the bread put between the heaters 81, 82 and 83 have all both surfaces baked by means of the central heater 81, the left heater 83 and the right heater 82 (S327).

As described above, the present invention is constructed such that a plurality of heaters installed for using when the bread is baked in the combined toaster and microwave oven can be selectively operated. The above construction solves a problem in which unnecessary power consumption is caused by the fact that a conventional plurality of heaters are always operated and in which the bread should be always baked on its both surfaces, while enabling the operation of the heater to be controlled according to the bread kind.

Figure 7:
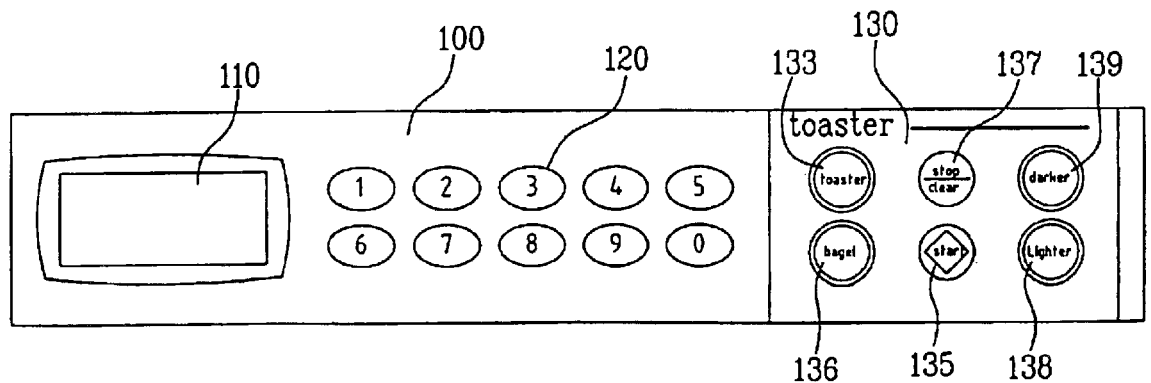
FIG. 7 is a view illustrating a control panel of a combined toaster and microwave oven according to a preferred embodiment of the present invention.

FIG. 7 is a view illustrating a control panel of the combined toaster and microwave oven according to a preferred embodiment of the present invention.

The control panel 100 includes the display unit 110 for displaying each kind of signal, a cooking button unit 120 for controlling cooking of a microwave oven, and the toaster button unit 130 for controlling an operation of the toaster.

The toaster button unit 130 includes a 'toaster' button 133 for selecting in case the bread is baked on its both surfaces, and a 'bagel' button 136 for selecting in case the bread is baked on its one surface. Further, it includes a 'darker' button 139 and a 'lighter' button 138 for variably controlling a browning level of the bread. The darker button 139 is used for controlling the browning level to be in a higher state, and the lighter button 138 is used for controlling the browning level to be in a lower state.

When the darker button 139 and the lighter button 138 are used, on the display unit 110 is displayed the browning level selected by the user. The present invention distinguishes the browning level from a first level to a ninth level, and the browning level is displayed using a digit on the display unit 110. An initial state of the browning level is set to a fifth level. This is for enabling the browning level to be conveniently controlled by setting the initial state to be in the fifth level as a middle value.

Hereinafter, when the above-constructed inventive combined toaster and microwave oven bakes the bread, a control method of the browning level using the control panel 100 will be described.

Figure 8:
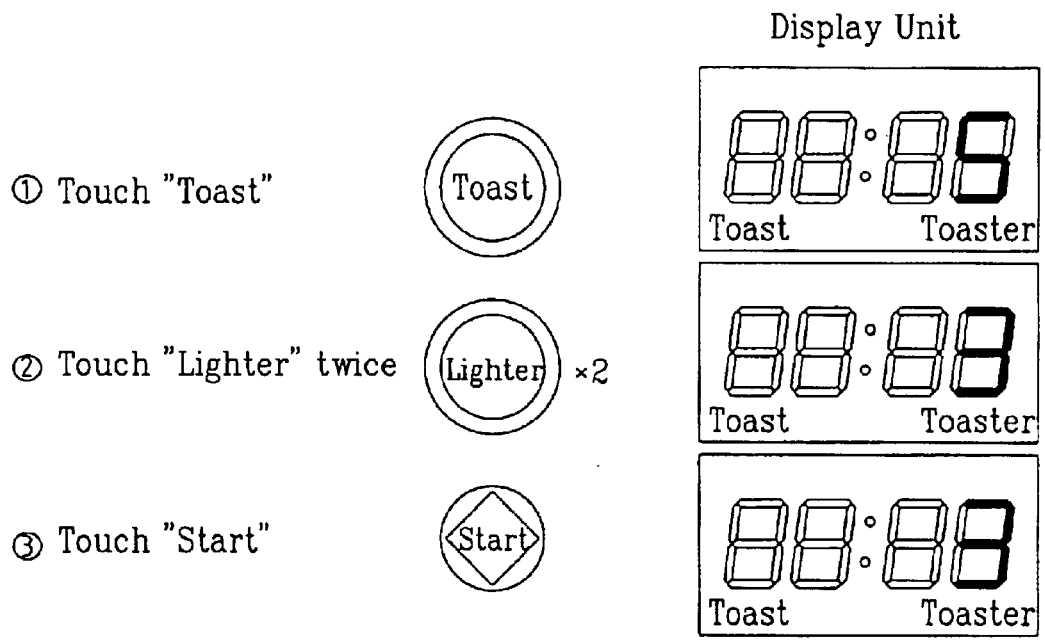
FIG. 8 is a view illustrating an example of controlling a browning level in a toast mode using a control panel of FIG. 7.
Figure 9:
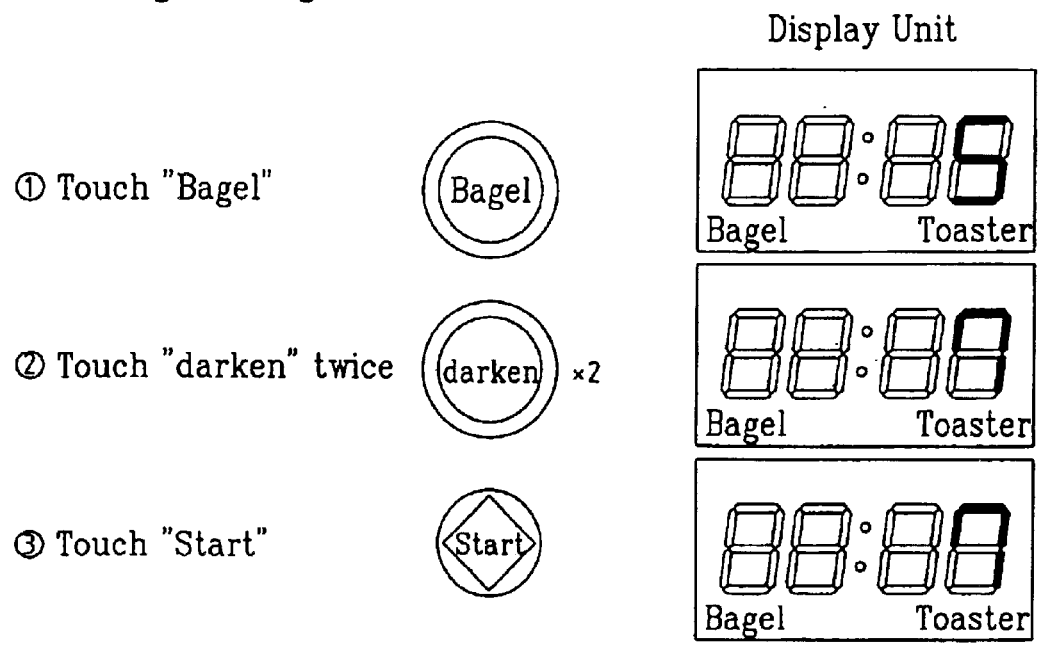
FIG. 9 is a view illustrating an example of controlling a browning level in a bagel mode using a control panel of FIG. 7.
Figure 10:
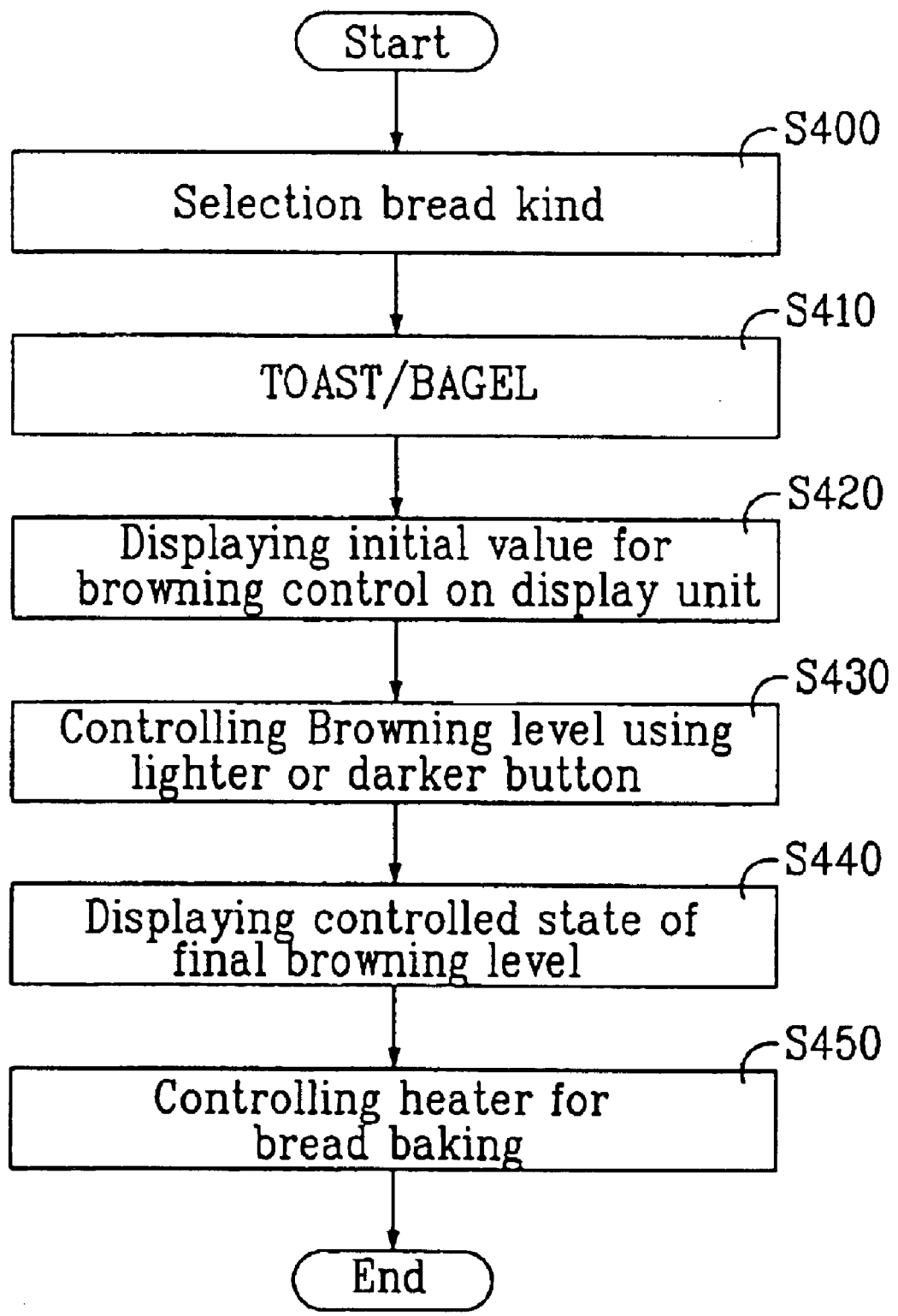
FIG. 10 is a flow chart illustrating a procedure of controlling a browning level using a control panel of FIG. 7.

FIG. 8 is a view illustrating an example of controlling the browning level in a toast mode using the control panel 100 of FIG. 7, FIG. 9 is a view illustrating an example of controlling the browning level in a bagel mode using the control panel 100 of FIG. 7, and FIG. 10 is a flow chart illustrating a procedure of controlling the browning level using the control panel 100 of FIG. 7.

In case the inventive combined toaster and microwave oven bakes the bread, at first, it should be determined whether the bread is baked on its both surfaces or one surface of according to the bread kind. Accordingly, the user selects the bread kind through the toaster button unit 130 (S400).

As shown in FIG. 8, in case the user selects the toast button 133 of the toaster button unit 130 (S400), the controller 250 acknowledges the toast mode in which the bread is baked on the both surfaces (S410). Additionally, the controller 250 acknowledging the toast mode controls to display the "fifth level", which is set to be in the initial state for the browning control, in the digit on the display unit 110 (S420). At this time, the controller 250 can control to display a message ("TOASTER") or a picture informing of being under the toast mode, on the display unit 110, and can control to display the message or the picture informing of being under operation of the toaster in the combined toaster and microwave oven.

Next, the user sets the browning level of the bread to be baked (S430). At this time, the darker button 139 and the lighter button 138 provided in the toaster button unit 130 are used to control the browning level. For example, a symbol ② of FIG. 8 illustrates the browning level which is decreased by two levels than the initial state (fifth level) through a user's twice touching on the lighter button 138. As above, the display unit 110 displays the browning level set by the user (S440).

After that, if the user touches a start button 135, a baking operation is performed in a state in which the browning level is set a "third level" in the toast mode. At this time, the controller 250 controls to operate the heater (80 of FIG. 3) according to the browning conditions (that is, the toast mode, the third level of the browning level) set by the user (S450). The controller 250 acknowledges the third level of the browning level set by the user, and controls to operate the heater during the operation time corresponding to the third level of the browning level. Additionally, the controller 250 controls to display user's final selection items on the display unit 110, and performs the operation control of each of the components based on the final selection items.

As shown in FIG. 9, in case the user selects the bagel button 136 of the toaster button unit 130 in the step of S400, the controller 250 acknowledges the bagel mode in which the bread is baked on its one surface (S400). Additionally, the controller 250 acknowledging the bagel mode controls to display the "fifth level" set to be in the initial state for browning control, in the digit on the display unit 110 (S420). At this time, the controller 250 can control to display the message or the picture informing of being under the bagel mode, on the display unit 110, and can control to display the message ("TOASTER") or the picture informing of being under operation of the toaster in the combined toaster and microwave oven.

Next, the user sets the browning level of the bread to be baked (S430). At this time, the darker button 139 and the lighter button 138 provided in the toaster button unit 130 are used to control the browning level. For example, a symbol ② of FIG. 9 illustrates the browning level which is increased by two levels than the initial state (fifth level) by a user's twice touching on the darker button 139. As above, the display unit 110 displays the browning level set by the user (S440).

After that, if the user touches the start button 135, a baking operation is performed in a state in which the browning level is set a "seventh level" in the bagel mode. At this time, the controller 250 controls to operate the heater (80 of FIG. 3) according to the browning conditions (that is, the bagel mode, the seventh level of the browning level) set by the user (S450) The controller 250 acknowledges the seventh level of the browning level set by the user, and controls to operate the heater during the operation time corresponding to the seventh level of the browning level. Additionally, the controller 250 controls to display the user's final selection items on the display unit 110, and performs the operation control of each of the components based on the final selection items.

As described above, the present invention includes the toaster button unit 130 for allowing the user to conveniently set the browning level. The initial state of the browning level is set to the middle value (fifth level) of the browning level, and in case it is intended to increase the browning level, the darker button 139 of the toaster button unit 130 is touched such that the browning level is changed in a sequence of a sixth level, the seventh level, an eighth level and the ninth level, and to the contrary, in case it is intended to decrease the browning level below the middle value, the lighter button 138 is touched such that the browning level is changed in a sequence of a fourth level, the third level, a second level and the first level. Accordingly, the user can use the browning level by variously adjusting from the first level to the ninth level. Additionally, since the browning level can be set to a predetermined value, the browning level which the user desires can be obtained in the identical degree even in several toaster operations.

Figure 11:
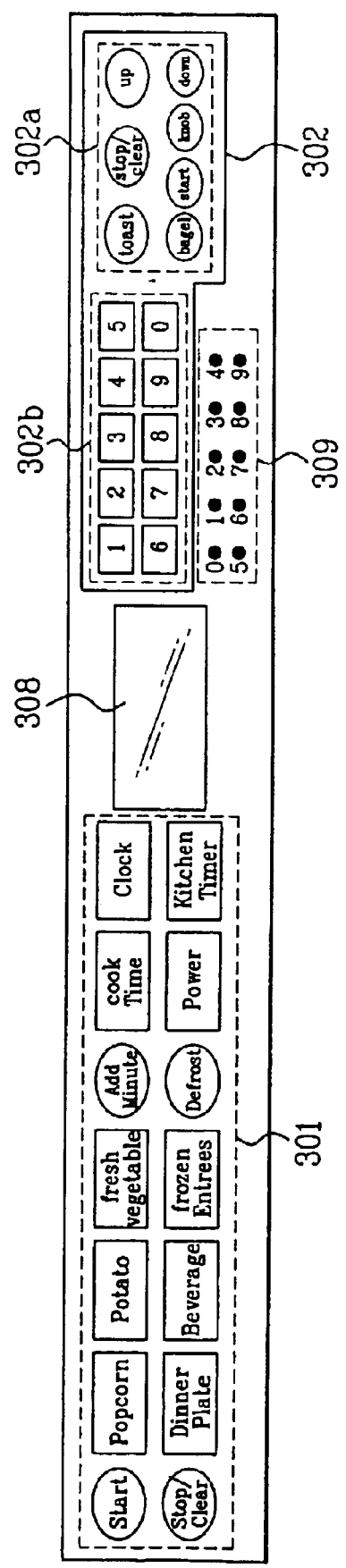
FIG. 11 is a view illustrating a control panel of a combined toaster and microwave oven according to another embodiment of the present invention.

FIG. 11 is a view illustrating the control panel of the combined toaster and microwave oven according to another embodiment of the present invention.

As shown in FIG. 11, the control panel includes a first key input unit 301 for selecting each kind of functions of the microwave oven; a second key input unit 302 for selecting each kind of menus of the toaster, the bread kind and the bread baking level; a first display unit 308 for displaying, in a character or picture form, the function and the operation state corresponding to the user's command inputted through the first and second key input units 301 and 302; and a second display unit 309 for displaying the bread baking level selected through the second key input unit 302.

The second key input unit 302 includes a selection unit 302a for selecting each kind of functions and menus of the toaster; and a digit key input unit 302b comprised of a plurality of digit buttons so that the user can input the bread baking level as the digit key. The selection unit 302a includes a toast button (toast) and a bagel button (bagel) for selecting the bread kind (toast or bagel); a stop/clear button (stop/clear) for inputting a stop/reset command; a start button (start) for inputting a start command; an up/down button (up/down) for selecting the bread baking level or a cooking time, etc.; and a dial knob (knob) for dialing to set the bread baking level or the cooking time.

The first display unit 308 is comprised of a liquid crystal display device or an 88-segment, and the second display unit 309 is comprised of a light emitting diode (LED) having the same number as that of the digit button of the digit key input unit 301b.

Hereinafter, described will be the method of controlling the operation of the combined toaster and microwave oven using the control panel of FIG. 11, particularly, the method of controlling the browning level in the toaster.

Figure 12:
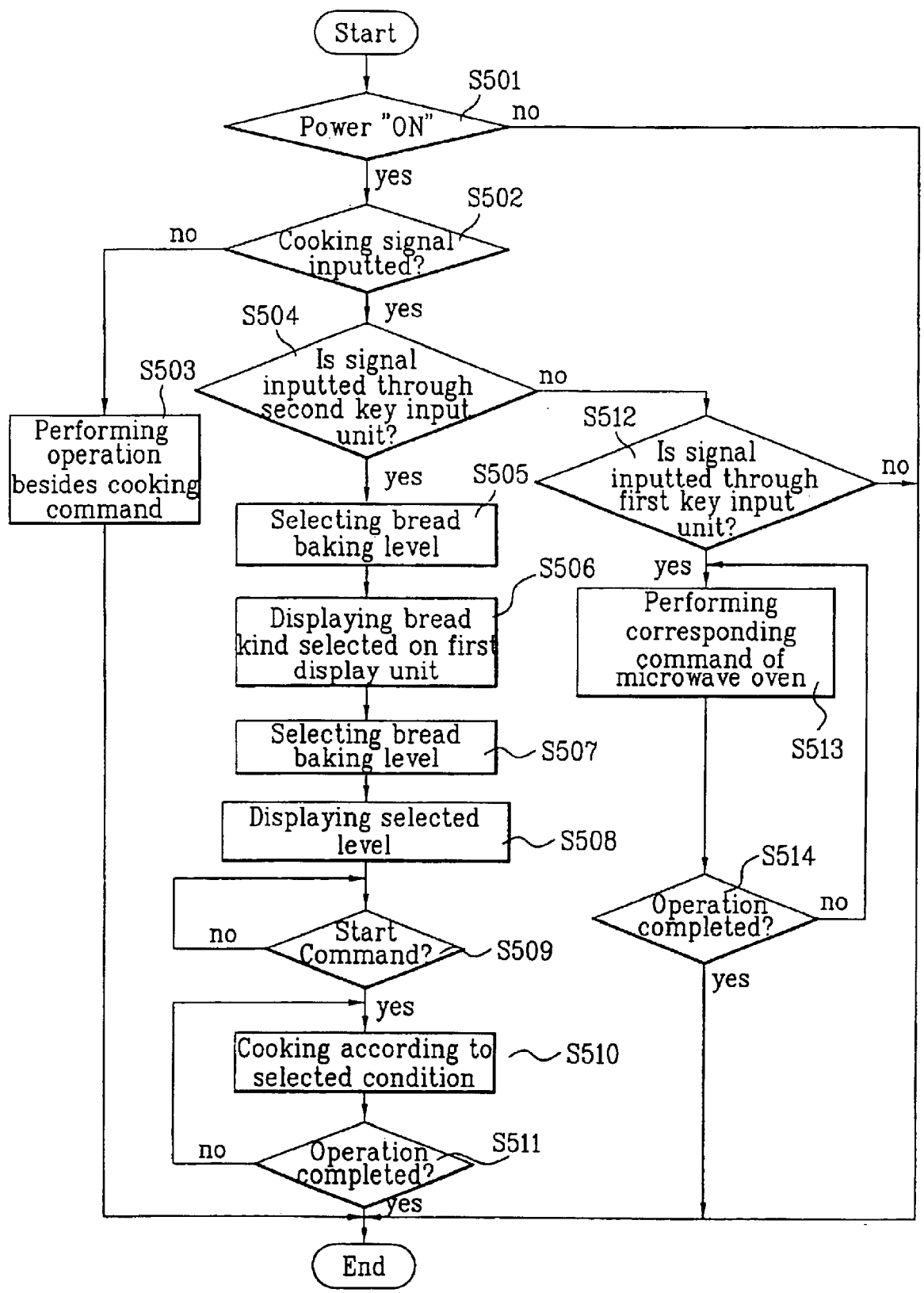
FIG. 12 is a view illustrating a control method of a combined toaster and microwave oven using a control panel of FIG. 11.

FIG. 12 is a view illustrating the control method of the combined toaster and microwave oven using the control panel of FIG. 11.

As shown in FIG. 12, at first, after the controller 250 determines whether the power supply is turned on (S501), it is determined whether the cooking signal is inputted (S502).

Additionally, if it is determined that the cooking signal is inputted in the step of S502, it is determined whether the user inputs the cooking signal from any of the first key input unit 301 and the second key input unit 302 (S504, S512).

If the user inputs a command through the second key input unit 302, the controller 250 displays the function and the menu, etc. of the toaster on the first display unit 308. The menu includes a list of the bread kind.

After that, the user selects the bread kind among the menu of the toaster displayed on the first display unit 308 (S505). After the controller 250 acknowledges the function or the menu of the toaster selected by the user, particularly, the bread kind selected by the user, it displays the bread kind selected by the user on the first display unit 308 (S506).

Next, the user selects the bread baking level, and the selected browning level is displayed (S507~S508). At this time, the bread baking level can be directly selected at a desired level through the digit button of the digit key input unit 302b, or can be inputted through the up/down button, or can be selected at the desired level by dialing the dial knob. And, the level selected through the second key input unit 302 is displayed on the first display unit 308 in its corresponding digit, and at the same time, is displayed on the second display unit 309 by lighting-ON a corresponding LED.

After that, if the user inputs the start command, the cooking is performed according to the selected browning condition, and if all operations are completed, the operation is terminated in the toaster (S509–511).

If the user does not input the signal through the second key input unit 302 in the step of S504, it is determined whether the signal is inputted through the first key input unit 301 (S512). Additionally, if the signal is inputted through the first key input unit 301, a corresponding command is performed in the microwave oven, and if the operation is completed, the termination is performed (S513–514).

As described above, in case the control panel of FIG. 11 is used, since the bread kind selected by the user can be displayed and at the same time, the selected bread baking level can be displayed, the user can more easily acknowledge and select the bread kind and the bread baking level.

Figure 13:
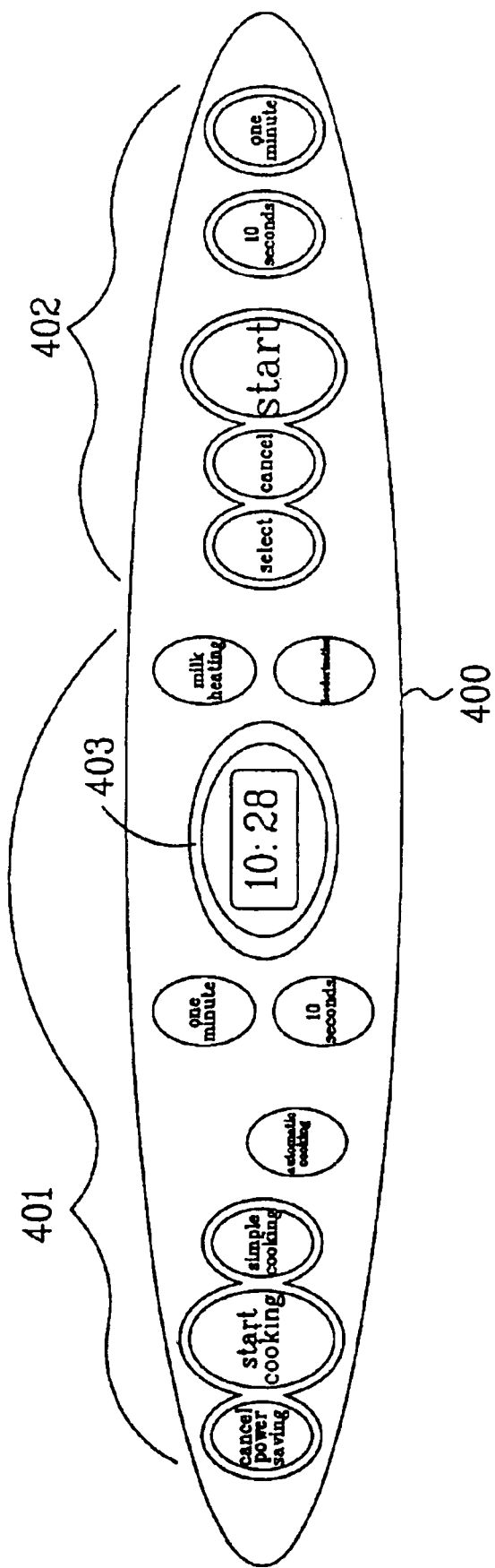
FIG. 13 is a view illustrating a control panel of a combined toaster and microwave oven according to yet another embodiment of the present invention.

FIG. 13 is a view illustrating the control panel of the combined toaster and microwave oven according to yet another embodiment of the present invention.

As shown in FIG. 13, the control panel using a tactile switch includes a cooking button unit 401 having the cooking keys for controlling the operation function of the microwave oven; and a toaster button unit 402 for controlling the function of the toaster.

The cooking button unit 401 includes an automatic cooking selection key for performing a predetermined automatic cooking function; and a thawing selection key for thawing; a deodorization selection key for deodorization, etc. Additionally, it includes a cooking selection key for setting each kind of cooking functions and the cooking time, etc.

The toaster button unit 402 includes keys for setting a time, and a start key, etc. Also, it includes a cancel key for just stopping the operation of the toaster even for a while heating the toaster.

Figure 14:
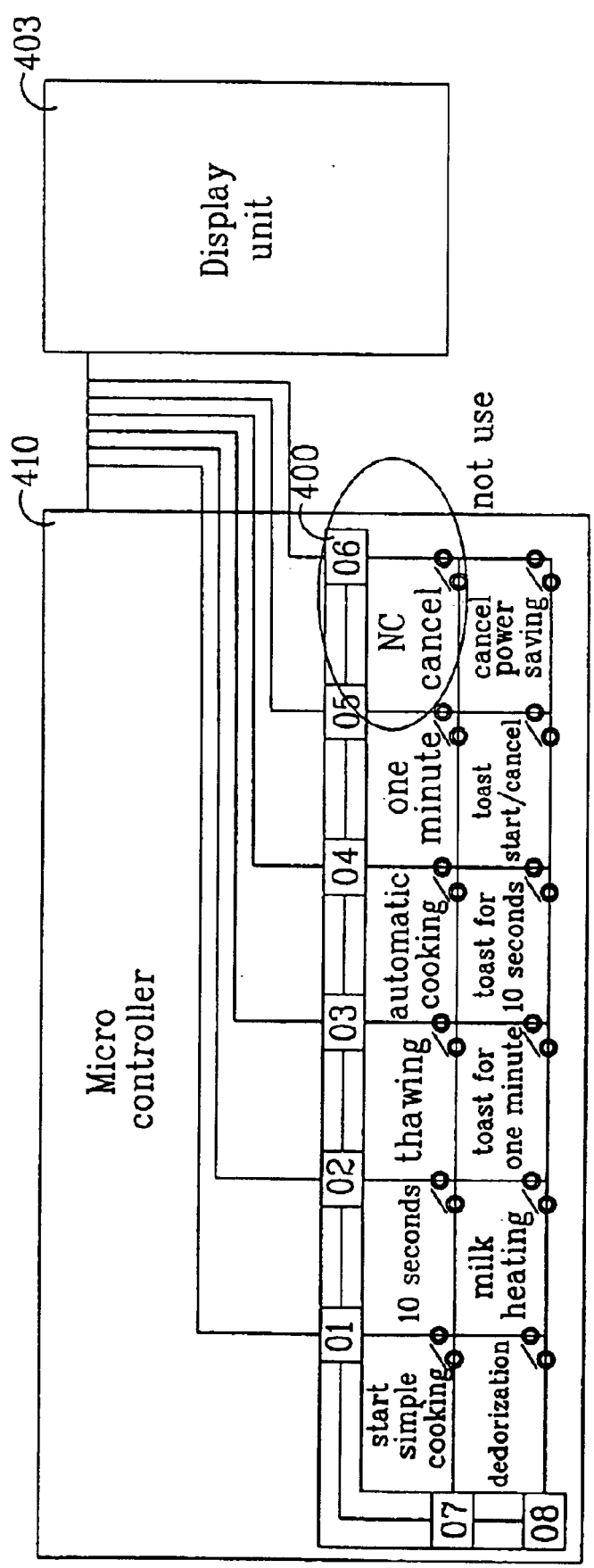
FIG. 14 is a construction view illustrating constructions necessary for controlling an operation of a combined toaster and microwave oven according to a preferred embodiment of the present invention.

FIG. 14 is a construction view illustrating constructions necessary for controlling the operation of the combined toaster and microwave oven according to a preferred embodiment of the present invention.

As shown in FIG. 14, the combined toaster and microwave oven includes a control panel 400 for inputting the cooking signal; a micro controller 410 for receiving the signal inputted to the control panel 400 to control the operation of the microwave oven; and a display unit 403 for displaying the cooking function selected by the user.

If the user selects an operation function key included in the control panel 400, an operation function selected by the user is transmitted to the micro controller 410. Accordingly, the micro controller 410 controls to display the operation function selected by the user on the display unit 403. At the same time, an oven pan or a heater, etc. is operated to heat a cooking food.

If the toaster function is selected, the micro controller 410 controls to display the toaster function on the display unit 403 and to, at the same time, heat the heater of the toaster. Due to this, the bread inserted into the toaster is baked. If the user selects the cancel key during the time of baking the bread in the toaster, the micro controller 410 controls to stop a heating energy supplied for the toaster. At the same time, through the display unit 403, a heating stop due to the cancel key inputted is displayed.

As described above, the present invention includes the cancel key against the toaster function so that if the user selects the cancel key anytime, the heating can be stopped in the toaster while the heating energy is supplied for the toaster.

Figure 15:
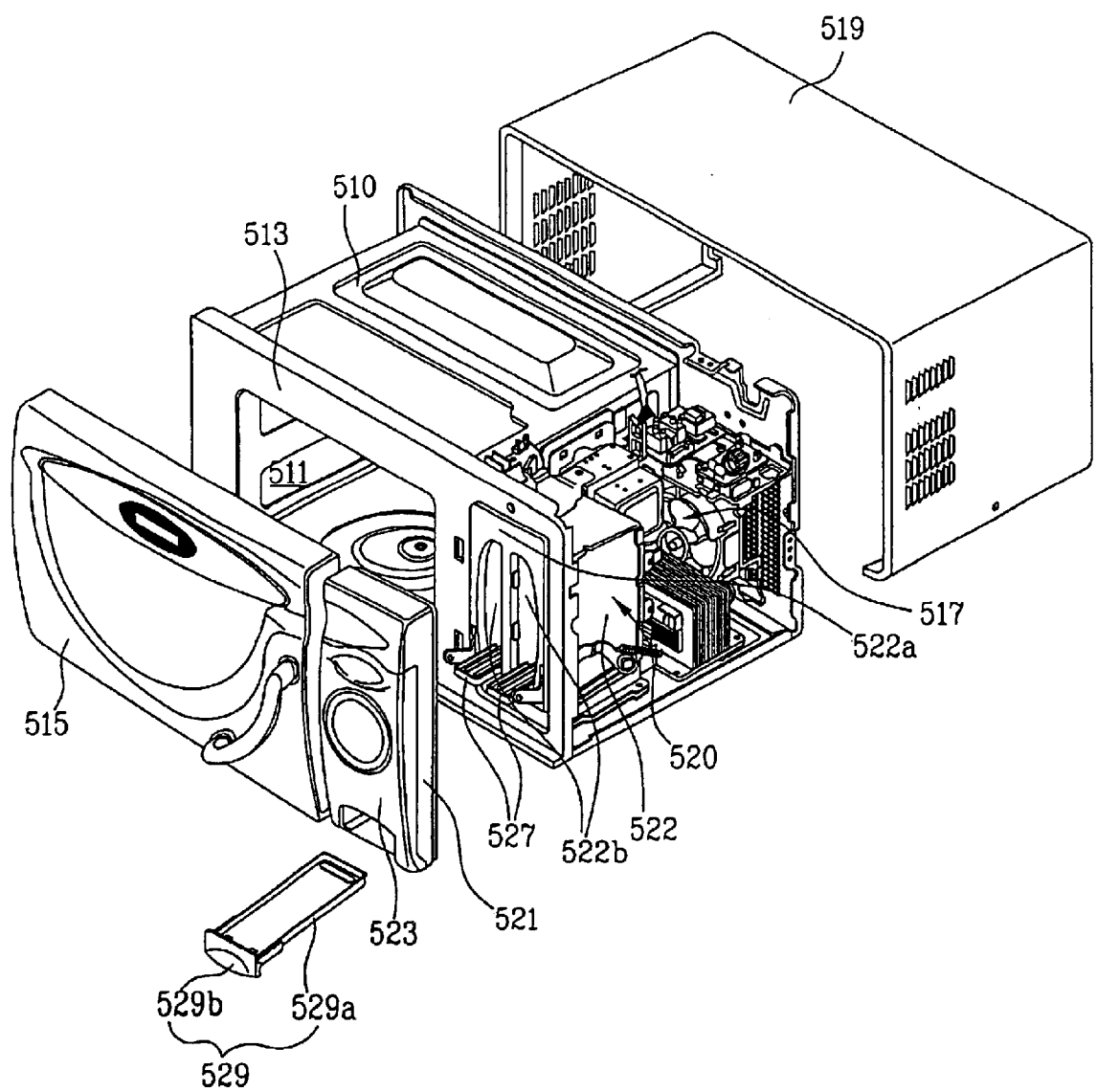
FIG. 15 is a view illustrating a combined toaster and microwave oven according another embodiment of the present invention.

FIG. 15 is a view illustrating the combined toaster and microwave oven according another embodiment of the present invention as a varied embodiment in FIG. 2.

As shown in FIG. 15, in an internal section of a cavity assembly 510 of the combined toaster and microwave oven is formed a cooking chamber 511 as a space for heating the cooking food by microwave, and the cooking chamber 511 is opened and closed by a cooking chamber door 515 installed pivotally at one side of a front plate 513 of the cavity assembly 510.

Additionally, at one side (right side in the drawing) of the cavity assembly 510 is formed the electronic chamber 517 in which each kind of electronic components is installed for oscillating microwave. An upper side and both sides of the cavity assembly 510 including the electronic chamber 517 are screened by an outer case 519 forming an appearance of an upper surface and a both side surface of the microwave oven.

In an internal section of the electronic chamber 517 is installed the toaster 520 as an apparatus for baking the bread. The toaster 520 includes a toaster panel 521 forming a front thereof; a toaster case 522 installed in rear of the toaster panel 521 and having a predetermined space therein; and a toaster door 523 installed at one side of the toaster panel 521 such that its front end can be rotated up and down centering around its lower end at a predetermined angle. The toaster panel 521 can be formed of the same material as that of the cooking chamber door 515 thereby providing a front appearance integral with the microwave oven.

Additionally, the toaster 520 includes a bread tray 527 and a bread fragment tray 529 which are drawn through the toaster panel 521.

On front of the toaster case 522 is mounted a toaster front 522a having a pair of input/output ports 522b. The input/output ports 522b for inputting and outputting the bread therethrough are formed in an up and down direction in the toaster front 522a and is rounded with a predetermined curvature at one side thereof.

Figure 16:
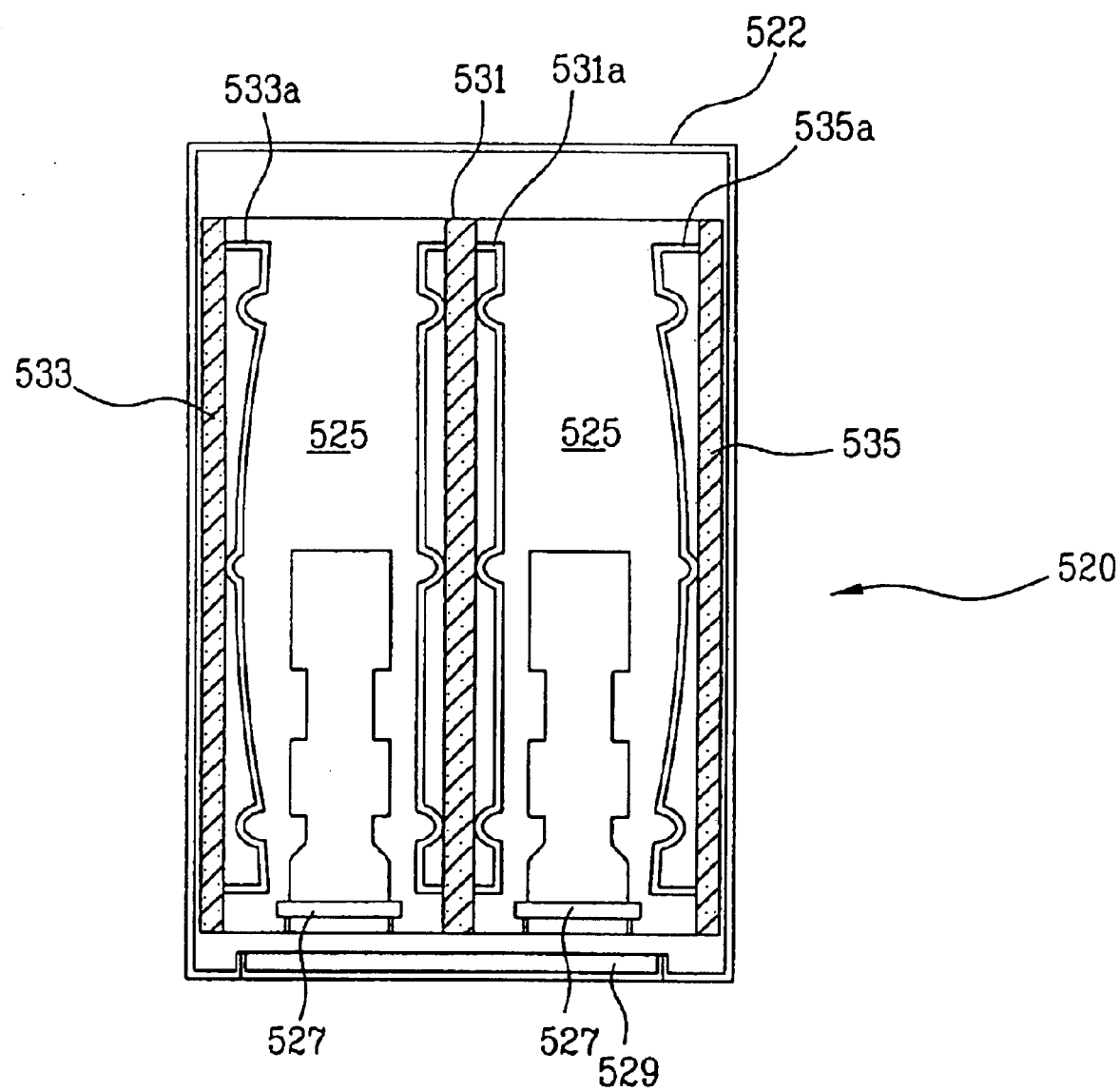
FIG. 16 is a view illustrating a toaster of FIG. 15.

FIG. 16 is a view illustrating the toaster 520 of FIG. 15.

As shown in FIG. 16, in the internal section of the toaster case 522 is formed a pair of slots 525 in the up and down direction. The slots 525 for inserting the bread thereinto, are extended to the rear of the toaster case 522 from the input/output ports 522b.

Also, the slots 525 are shaped in the same type as that of the input/output port 522b, and are rounded at one side thereof with a predetermined curvature. Accordingly, various kinds of the bread such as, for example, a donut-shaped bagel as well as a common-shaped bread having a rectangular section can be inserted.

In the embodiment shown, the one side surface adjacent to the toaster case 122 of the both side surfaces of the slots 525 is rounded with a predetermined curvature. However, the present invention is not limited to this, and it is justified that any one side surface in both side surfaces of the slot 525 can be rounded with the predetermined curvature.

The donut-shaped bagel has generally its exterior surface already browned, and is mainly baked with half-cut. The half-cut bagel is inserted into the slot 525 such that its browned exterior surface faces toward a curved surface of the slot 525, and its cut surface faces toward the other side surface of the slot 525. Accordingly, in the cut bagel, its cut surface only is heated and baked by the central heater 531, and its browned surface is not baked.

At both sides of the slot 525 are respectively installed in heaters 531, 533 and 535. The heaters 531, 533 and 535 heat the bread, and in the embodiment shown, at both sides of the internal section of the toaster case 522 are respectively installed the left and right heaters 533 and 535, and between the slots 525 is installed the middle heater 531.

The heaters 531, 533 and 535 are constructed to be under individual control. An driving element for respectively opening and closing a power route of the heaters 531, 533 and 535, and a control unit for selectively controlling an operation of the heaters 531, 533 and 535 can allow the one surface or the both surfaces of the bread to be heated. This will be described later.

Also, on the side surfaces of the heaters 531, 5.33 and 535 are respectively provided a plurality of bread holders 531a, 533a and 535a protruded toward the slot 525. The bread holders 531a, 533a and 535a are respectively installed on both side surfaces of the central heater 531 and on one side surfaces of the left and right heaters 533 and 535. The bread holder 531a provided on the both side surfaces of the central heater 531 is flat-shaped without a curved surface, and the bread holders 533a and 535a respectively installed on the one side surfaces of the left and right heaters 533 and 535 are curve-shaped. The one side surface of the slot 525 is curve-shaped due to the shapes of the bread holders 531a, 533a and 535a.

The both side surfaces of the bread inserted into the slot 525 are not in direct contact with surfaces of the heaters 531, 533 and 535, and are in contact with the bread holders 531a, 533a and 535a. Further, in the embodiment shown, the bread holders 531a, 533a and 535a are respectively installed in the up and down direction at both sides of the heaters 531, 533 and 535, but not limited to this, and it is justified that the bread holders 531a, 533a and 535a are respectively installed in a horizontal direction at the both sides of the heaters 531, 533 and 535.

In a lower part of the slot 525 is horizontally installed a bread tray 527 for facilitating the bread inserted into the slot 525 to be inputted/outputted. The bread tray 527 is inputted and outputted toward the front and rear of the slot 525 in connection with rotation of the toaster door 523 (Referring to FIG. 15), such that the bread seated on an upper surface of the bread tray 527 is easily inputted into and outputted from the slot 525.

Further, in a lower part of the toaster case 522 is installed a bread fragment tray 529 for collecting the bread fragment generated through the bread inputting/outputting process and the baking process in the internal section of the toaster case 522. The bread fragment tray 529 is comprised of a tray body 529a for collecting the bread fragment and a tray handle 529b grasped by the user, and the bread fragment tray 529 is inputted and outputted toward the front and rear of the toaster 520 through an opening of the toaster panel 521.

It can be appreciated that the present invention shown in FIGS. 15 and 16 has a basic technical scope that, one surface of the slot having the bread inserted thereinto is rounded with the predetermined curvature so that the donut-shaped bagel as well as the common-shaped bread having the rectangular section can be also baked, and a plurality of heaters for baking the bread are constructed to be selectively operated so that the one surface or the both surfaces of the bread can be selectively baked according to the bread kind.

INDUSTRIAL APPLICABILITY

The inventive combined toaster and microwave oven can obtain the following effects.

First, according to the bread kind and a consumer's favor, the bread can be selectively baked on its one surface or both surfaces. Accordingly, comparing with the conventional combined toaster and microwave oven in which the bread should be absolutely baked on its both surfaces, the present invention has an advantage in which the bread can be effectively baked.

Second, the present invention can control such that the plurality of heaters is necessarily operated all together or only some heaters among them are selectively operated. Accordingly, the present invention has an advantage in which the heater can be effectively controlled, a life reduction due to unnecessary use of the heater can be suppressed, and an unnecessary power waste can be prevented.

Third, since the browning level can be set to be constant, the browning level, which the user desires, can be obtained at the identical degree even in several toaster operations.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A combined toaster and microwave oven, comprising:
   a plurality of heaters;
   a control panel for selecting a bread kind and a bread baking level which a user desires;
   a display unit for displaying the bread kind and the bread baking level selected in the control panel;
   a first driving element connected to a first portion of the plurality of heaters;
   a second driving element connected to the first driving element and to a second portion of the plurality of heaters; and a controller connected to the first and second driving elements for controlling a selective operation of the plurality of heaters in order to heat one or both surfaces of a slice of bread according to the bread kind and the bread baking level selected in the control panel.

2. The combined toaster and microwave oven of claim 1, wherein the control panel comprises:

a bread selection button unit for selecting the bread kind; and a level selection button unit for selecting any one of bread baking levels distinguished into a plurality of stages.

3. The combined toaster and microwave oven of claim 2, wherein the level selection button unit is comprised of an up/down button, a dial knob and a plurality of digit buttons.

4. The combined toaster and microwave oven of claim 1, wherein the control panel comprises a cancel key for canceling a function of the toaster being under operation.

5. The combined toaster and microwave oven of claim 1, wherein the display unit comprises:

display means for displaying the selected bread kind by a character and a picture; and a plurality of light emitting elements comprised of the same number as that of the number of the bread baking levels to display the selected bread baking level.

6. The combined toaster and microwave oven of claim 1, wherein, before the bread baking level is selected by a user, the display unit displays a digit corresponding to a middle level among a plurality of bread baking levels.

7. The combined toaster and microwave oven of claim 1, wherein the controller determines whether the one surface or the both surfaces of the bread is baked according to the selected bread kind, and sets a bread baking time according to the selected bread baking level.

8. The combined toaster and microwave oven of claim 1, wherein the controller operates a central heater disposed between the slots in case it is intended to bake the one surface of the bread, and operates the central heater and side heaters disposed at sides of the slots in case it is intended to bake the both surfaces of the bread.

9. The combined toaster and microwave oven of claim 8, wherein:

the first driving element controls the central heater disposed between the slots according to control of the controller; and the second driving element controls the side heaters disposed at the sides of the slots according to control of the controller.

10. The combined toaster and microwave oven of claim 1, further comprising a bread holder having a curved surface at one side surface of the slot.

11. A control method of a combined toaster and microwave oven, the method comprising:

selecting a bread kind by user;

selecting a bread baking level by a user;

displaying the selected bread kind and bread baking level;

determining whether a slice of bread having opposing surfaces is to be baked on one surface or on both surfaces according to the selected bread kind;

setting a bread baking time according to the selected bread baking level; and cooking one or both surfaces of the slice of bread according to the determining and the setting, the cooking including operating either a first switch for causing the one surface of the slice of bread to be baked or a combination of the first switch and a second switch for causing both surfaces of the slice of bread to be baked according to the determining, wherein the first and second switches are electrically connected to each other.

12. The control method of claim 11, further comprising the step of, before the bread baking level is selected by the user, displaying a digit corresponding to a middle level among a plurality of predetermined bread baking levels.

13. The control method of claim 11, wherein the selected bread kind is displayed using a character or a picture, and the selected bread baking level is displayed using a plurality of light emitting elements comprised of the same number as that of the predetermined bread baking levels.

14. The control method of claim 11, wherein the bread baking level is selected by the user using digit buttons comprised of the same number as that of the predetermined bread baking levels.

15. The control method of claim 11, wherein the bread baking level is selected using an up/down button by the user.

16. The control method of claim 11, wherein the bread baking level is selected using a dial knob by the user.

17. A combined toaster and microwave oven, comprising:

a central heater disposed between slots in a toaster and side heaters disposed on side surfaces of the slots so as to heat a slice of bread;

a control panel for selecting a bread kind and a bread baking level which a user desires;

a display unit for displaying the bread kind and the bread baking level selected in the control panel;

a controller for controlling a selective operation of the heaters according to the bread kind and the bread baking level selected in the control panel; and first and second driving elements for respectively supplying a power supply for the central heater and the side heaters according to control of the controller, wherein the first and second driving elements are directly connected to each other.

18. The combined toaster and microwave oven of claim 17, wherein the controller turns the first driving element on in case it is intended to bake one surface of the slice of bread, and turns the first and second driving elements on in case it is intended to bake both surfaces of the slice of bread.

19. The combined toaster and microwave oven of claim 17, wherein the display unit comprises:

display means for displaying the selected bread kind by a character and a picture, and for displaying the selected bread baking level by a digit; and a plurality of light emitting elements comprised of the same number as that of the number of the bread baking levels to display the selected bread baking level.

20. The combined toaster and microwave oven of claim 17, further comprising:

a flat-shaped bread holder disposed on one side surface of the slot; and a curve-shaped (surface-curved) bread holder disposed on the other side surface of the slot.

* * * * *